United States Patent
Stürmer et al.

(10) Patent No.: US 7,143,886 B2
(45) Date of Patent: Dec. 5, 2006

(54) ARRANGEMENT FOR GENERATING ACTUATION FORCE IN A CENTRIFUGAL CLUTCH

(75) Inventors: Winfried Stürmer, Euerbach (DE); Reinhold Weidinger, Kolitzheim (DE)

(73) Assignee: ZF Sachs AG, Schweinfurt (DE)

( * ) Notice: Subject to any disclaimer, the term of this patent is extended or adjusted under 35 U.S.C. 154(b) by 0 days.

(21) Appl. No.: 10/861,039

(22) Filed: Jun. 4, 2004

(65) Prior Publication Data

US 2004/0262116 A1   Dec. 30, 2004

(30) Foreign Application Priority Data

Jun. 30, 2003   (DE) ................ 103 29 309

(51) Int. Cl.
*F16D 43/04* (2006.01)

(52) U.S. Cl. ............... 192/105 B; 192/89.24

(58) Field of Classification Search ........... 192/105 B, 192/89.23, 89.24, 105 A, 112, 115
See application file for complete search history.

(56) References Cited

U.S. PATENT DOCUMENTS

| | | | | |
|---|---|---|---|---|
| 1,618,644 | A | * 2/1927 | Dickson | 192/105 A |
| 3,006,449 | A | * 10/1961 | Binder | 192/105 B |
| 5,137,126 | A | * 8/1992 | Magnaval et al. | 188/343 |

FOREIGN PATENT DOCUMENTS

| | | |
|---|---|---|
| DE | 3019377 A1 | * 11/1981 |
| DE | 32 20 572 | 12/1982 |
| WO | WO 02/48530 | 6/2002 |

* cited by examiner

*Primary Examiner*—Saul Rogriguez
(74) *Attorney, Agent, or Firm*—Cohen, Pontani, Lieberman & Pavane

(57) ABSTRACT

An actuation force generating arrangement for a centrifugal clutch includes a housing, a supporting element, and a plurality of centrifugal members. The housing is rotatable about an axis, the housing having a plurality of first supporting areas which each extend radially with respect to the axis. The supporting element is axially movable with respect to the housing and has a plurality of second supporting areas which each extend radially with respect to the axis, each second support area being separated from a respective first support area by an axial distance which decreases with radial distance from the axis. Each of the first and second support areas has a first portion and a second portion which lies radially outside of the first portion, the first and second support areas being inclined with respect to each other at a relative inclination angle which is greater at the second portions than at the first portions. The centrifugal members are supported between respective pairs of first and second support areas, each centrifugal member being radially displaceable by centrifugal force along a respective pair of support areas.

4 Claims, 3 Drawing Sheets

ARRANGEMENT FOR GENERATING ACTUATION FORCE IN A CENTRIFUGAL CLUTCH

BACKGROUND OF THE INVENTION

1. Field of the Invention

The present invention is directed to an actuation force generating arrangement for a centrifugal clutch including a housing arrangement, a supporting element which is movable axially with respect to the housing arrangement, and a plurality of centrifugal members. Every centrifugal member is supported with respect to the housing arrangement in a first supporting area extending radially from the inside to the outside and is supported with respect to the supporting element in a second supporting area extending radially from the inside to the outside, and every centrifugal member is displaceable radially under the influence of centrifugal force along a pair of supporting areas which comprises a first supporting area and a second supporting area.

2. Description of the Related Art

A centrifugal clutch for use in motor vehicles is known from DE 32 20 572 A1. The roller elements acting as centrifugal members comprise a central roller with a larger diameter which can roll on a supporting area formed at the housing arrangement. Two rollers having a smaller diameter which are fixedly connected to one another and rotatable with respect to the central roller are provided at both sides of this central roller and can roll radially at a supporting area or at two supporting area portions separated in circumferential direction. The supporting areas formed at the housing on the one side and at the pressing plate on the other side are inclined relative to one another so that they move toward one another radially from the inside to the outside. As the result of a displacement of the centrifugal members toward the radial outside caused by centrifugal force, the centrifugal members being supported at the housing arrangement impinge axially on the pressing plate and accordingly move it in the engagement direction. When the centrifugal force reaches a sufficiently high value by means of increasing rotational speed, the centrifugal members reach a radial outer end position in which they strike against and come to rest at an outer circumferential wall of the housing arrangement. This contacting of the centrifugal members and housing arrangement generally produces a noticeable impact noise and, moreover, stresses the centrifugal members as well as the housing arrangement. This effect of the impacting of the centrifugal members is increased when, as is proposed in WO 02/48530 A1, the supporting areas forming a pair extend in their radial outer area at a smaller relative inclination angle, that is, for example, extend virtually parallel to one another, in order to be able to provide a hysteresis effect in the shifting characteristic of a centrifugal clutch of this type. Upon entering this area of the smaller relative inclination angle of the associated supporting areas, the counterforce which acts against an outward radial movement of the centrifugal members decreases spontaneously, so that the centrifugal members strike against a stop, e.g., at the housing arrangement, virtually without deceleration.

SUMMARY OF THE INVENTION

It is the object of the present invention to provide an actuation force generating arrangement for a centrifugal clutch in which the striking of the centrifugal members against the housing arrangement due to centrifugal force can be substantially prevented.

According to the invention, this object is met by an actuation force generating arrangement wherein the first supporting area and the second supporting area of a respective pair of supporting areas are inclined relative to one another and enclose a relative inclination angle, so that an axial distance between the first supporting area and the second supporting area of a respective pair of supporting areas decreases radially from the inside to the outside, wherein the relative inclination angle in a radial inner first portion of the first supporting area and of the second supporting area is smaller than in a radial outer second portion of the first supporting area and of the second supporting area.

The present invention utilizes the restraining effect produced by the relative inclination angle between associated supporting areas in order to make possible a smooth transition to a radial end position; that is, the greater the relative inclination angle enclosed between the associated supporting areas, the greater the restraining force opposing the centrifugal action through the two supporting areas. Accordingly, by suitable selection of the relative inclination angle in the radial outer second portion, it can be ensured that the centrifugal members practically never reach a radial outer stop position in the anticipated operating speed range, but rather are always held between the two supporting areas associated with this stop position. Accordingly, any impact noises or impact vibrations can be completely prevented.

In order to achieve a gradual or smooth transition to this radial outer holding state, it is suggested that the relative inclination angle in the second portion increases substantially continuously radially outward.

As was already mentioned, it is endeavored in principle to provide a hysteresis effect in centrifugal clutches of this type and in the actuation force generating arrangements for the latter so that when a centrifugal clutch of this kind is fully closed there is no re-releasing or opening of the clutch at those speeds at which the clutch has completely closed, but rather only at appreciably lower speeds. In order to realize this in the present invention also, it is suggested that the relative inclination angle in a transitional portion between the first portion and the second portion is smaller that the relative inclination angle in the first portion.

The present invention is further directed to a centrifugal clutch having an actuation force generating arrangement according to the invention.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
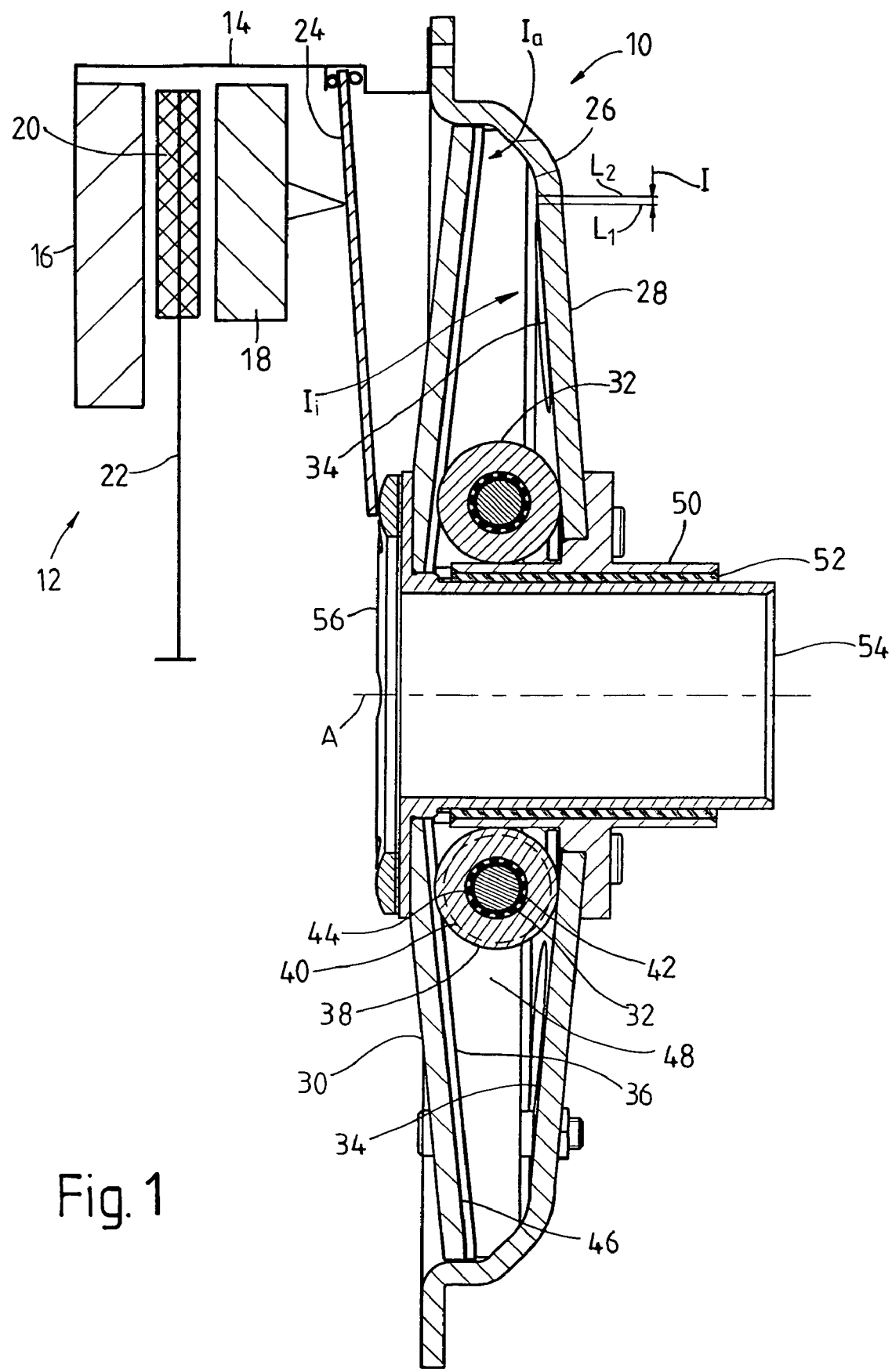
FIG. 1 shows a longitudinal section through an actuation force generating arrangement according to the invention.
Figure 2:
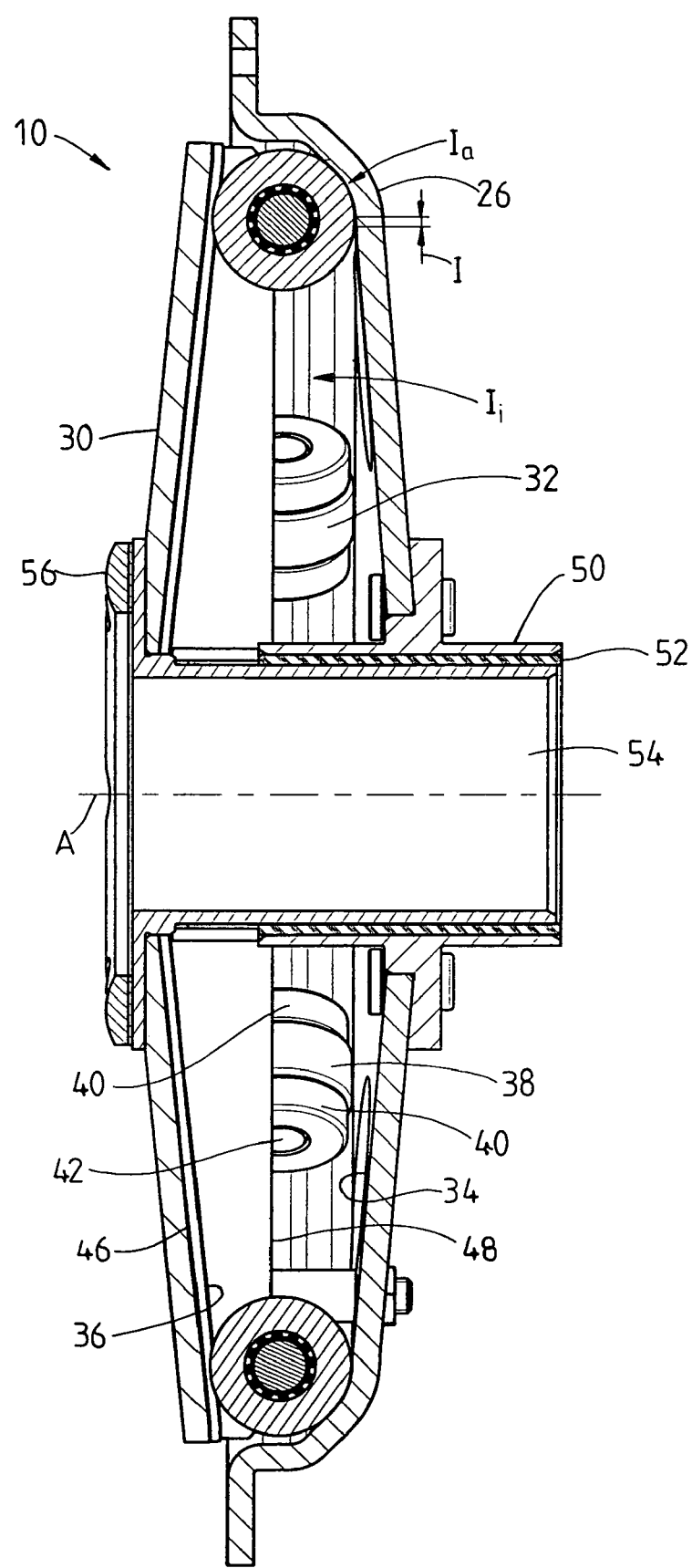
FIG. 2 shows the actuation force generating arrangement of FIG. 1 in a high speed state.

FIG. 1 shows an actuation force generating arrangement 10, according to the invention, in combination with a friction clutch 12, otherwise indicated only schematically, such as is used in a motor vehicle, particularly in a utility or commercial vehicle, in connection with an automatic transmission. This friction clutch 12 comprises a housing 14, shown schematically, which is fixedly connected to a flywheel 16. In the housing 14 is a pressing plate 18 which is coupled with the housing 14, e.g., by tangential leaf springs or the like which simultaneously also provide a lifting force, so as to be fixed with respect to rotation relative to it but movable in the direction of an axis of rotation A. The friction linings 20 of a clutch disk 22 are arranged between the pressing plate 18 and the flywheel 16. An actuation force transmission element 24 which is constructed as a diaphragm spring, for example, is supported with respect to the housing 14 at the radial outer side in both axial directions and, farther radially inward, acts upon the pressing plate 18, e.g., by means of a wear compensating device. The actuation force transmission element 24 is constructed and installed in such a way, for example, that it is held under pretensioning in the clutch releasing direction, that is, in this case, in the direction of the actuation force generating arrangement 10, so that for purposes of engagement an axially directed actuation force corresponding to the pretensioning force of the actuation force transmission element 24 must be provided initially by the actuation force generating arrangement 10 in order to move the pressing plate 18 in the direction of the friction linings 20.

The actuation force generating arrangement 10 also comprises a substantially annular or cup-shaped housing 26 which can be connected on the radial outer side to the housing 14 of the friction clutch 12 or can be constructed integral with it. In this housing 26, a supporting element 30 which is likewise ring-shaped or annular disk-shaped is provided axially opposite from a housing base area 28. A plurality of roller elements 32 presenting centrifugal members arranged so as to be distributed in circumferential direction and preferably at the same circumferential distance from one another are located between the supporting element 30 and the housing base area 28 of the housing 26. A first supporting area 34 and second supporting area 36 associated with each roller element 32 are provided at the housing 26 and supporting element 30, each supporting area 34 and 36 providing a rolling track or rolling path. The supporting areas 34, 36 extend radially from the inner side to the outer side. The roller elements 32 are constructed in such a way that they have a central roller element 38 with a greater diameter as can be seen the drawings. As is indicated in FIG. 1 at bottom by dashed lines, lateral roller elements 40 are located on both sides of this central roller element 38 in circumferential direction and are fixedly connected to one another by an axle part 42 and substantially freely rotatable with respect to the central roller element 38 by a bearing, e.g., a rolling body bearing 44. These lateral roller elements 40 are supported at the second supporting area 36 of the supporting element 30. It will be seen in FIG. 1 that each of these second supporting areas 36 provides a groove-like depression 46 associated with the central roller element 38, so that when the lateral roller elements 40 rest on or roll on the second supporting area 36 at both sides of this groove-like depression area 46, the central roller element 38 does not have rolling contact with the supporting element 30 as can also be seen from FIG. 1. Further, in order to provide a guide for the roller elements, substantially radially extending guide walls 48 are provided on both sides of a respective second supporting area 36, so that the roller elements 32 can move substantially only in radial direction, specifically, without tilting.

It will further be seen from FIG. 1 that the supporting areas 34, 36 associated with a respective roller element 32 are oriented with respect to one another in such a way that their distance from one another decreases radially from the inside to the outside. This can be achieved, for example, in that the two supporting areas 34, 36 are inclined relative to one another and relative to the axis of rotation A, e.g., they are not inclined in the same axial direction, so that a relative inclination angle not equal to zero is formed between the two supporting areas 34, 36 of a respective pair of supporting areas 34, 36 associated with a roller element 32 in every radial area.

FIG. 1 shows the nonrotating rest state in which, due to the above-mentioned pretensioning provided by the actuation force transmission element 24 and the relative inclination angle or wedge angle formed between the respective supporting areas 34, 36, the centrifugal elements 32 are pretensioned radially inward and are held in their radial innermost position. A sleeve-like first guide element 50 which is fixedly connected to the housing 26 by riveting or the like limits movement toward the radial inner side. It is noted that a second sleeve-like guide element 54 is guided in this first sleeve-like guide element 50, e.g., with the intermediary of a sliding bearing element 52 or the like, so as to be movable axially, the supporting element 30 being, for example, fixedly connected to it in order to ensure that the supporting element 30 cannot tilt when displaced axially. An annular impingement element 56 can be provided at this second sleeve-like guide element 50, and the actuation force can be introduced into the actuation force transmission element 24 through this annular impingement element 56.

Figure 3:
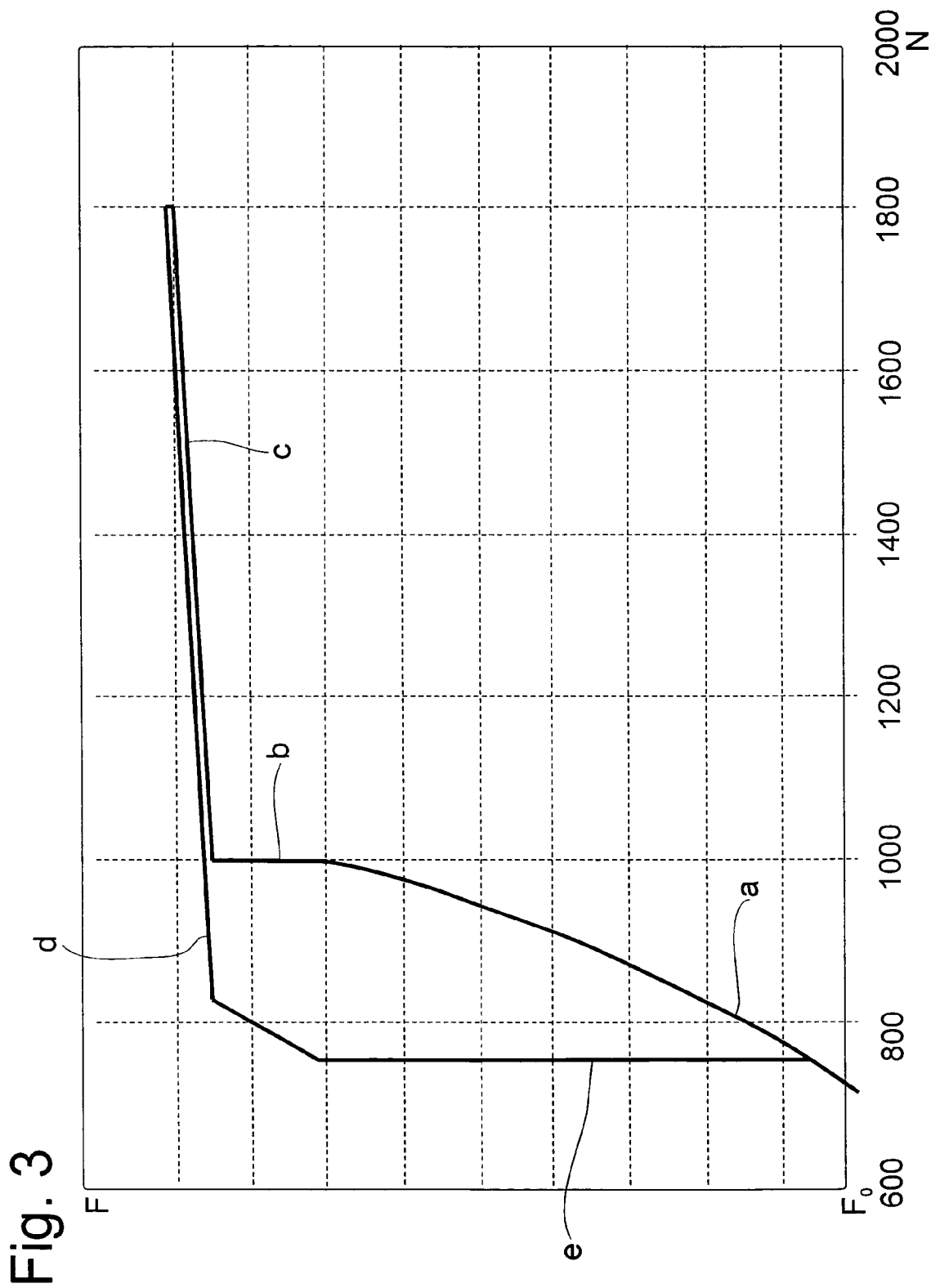
FIG. 3 is a graph showing the dependency of the actuation force F generated by the actuation force generating arrangement according to the invention upon speed N.

When the system is set in rotation, a centrifugal force which increases with the speed acts on the roller elements 32. This is illustrated by the ascending segment a in the speed N/actuation force F graph in FIG. 3. In particularly, it will also be seen that the actuation force first adopts a value above a base force $F_0$ at a speed of 700 revolutions per minute; this base force corresponds to the pretensioning force which is provided by the actuation force transmission element 24 and by which the centrifugal elements 32 are ultimately also held at their radial inner normal state. The clutch engagement process occurring with the support of centrifugal force actually begins only after this limiting speed which, for example, can be slightly above the idling speed.

As the speed increases, the centrifugal force increases so that the roller elements 32 are displaced radially outward to an increasing extent. Because of the relative inclination angle between the respective supporting areas 34, 36, the supporting element 32, guided through the second sleeve-like guide element 54, is displaced axially and exerts a correspondingly increasing force on the actuation force transmission element 24 and, therefore, on the pressing plate 18. This state persists approximately until a position represented by a line $L_1$ in FIG. 1 is reached at the first guide paths 34 at a speed of 1000 revolutions per minute. In an interval between this line $L_1$ and a line $L_2$ somewhat farther toward the outer side, the first supporting areas 34 are guided in such a way that they assume a course orthogonal to the axis of rotation A, for example. As a result of this, the relative inclination angle between the first supporting areas 34 and the second supporting areas 36 in a portion corresponding to this radial interval I is smaller than in the portion $I_i$ located radially inside the line $L_1$. As a result of the spontaneous transition from a greater relative inclination angle to a smaller relative inclination angle, the counterforce acting against the radial displacement of the roller elements 32 caused by centrifugal force also decreases suddenly in a corresponding manner. As a result, as is represented by a portion b in FIG. 3, the roller elements 32 are suddenly displaced radially outward in this interval or portion I due to the spontaneous breaking off of or decrease in the counterforce.

Adjoining this interval or this portion I on the radial outer side, is another portion $I_a$ of the supporting areas 34, 36 in which the relative inclination angle is now greater or increasingly greater. This can be discerned in particular by the fact that when the second supporting areas 36 extend farther approximately at the same angle of inclination to the axis of rotation A, the inclination angle of the first supporting areas 34 with respect to the axis of rotation A is increasingly greater, which means simply that the relative inclination angle between the associated supporting areas 34, 36 in this radial outer portion $I_A$ increases in a corresponding manner. However, this increase in the relative inclination angle means a corresponding increase in the holding force which acts against the displacement of the roller elements 32 by centrifugal force and which is substantially caused by the restoring forces extending in the friction clutch 12. This is noticeable in the graph shown in FIG. 3 in the shape of the curve segment c in which there is only a slight increase in the actuation force F at appreciably increasing speed, which means a correspondingly slight further axial displacement of the supporting element 30.

Accordingly, the basic function in providing this radial outer portion $I_a$ consists in that after passing through portion 1, in which there is substantially no holding force acting against the displacement caused by centrifugal force, the roller elements 30 do not strike abruptly against an outer circumferential wall of the housing 26, but rather are gradually braked by increasing relative inclination angles and, therefore, increasing holding force and when the friction clutch 12 is completely engaged are held in a position which is determined by a state of equilibrium of the centrifugal force and the holding force which is also caused substantially by the relative inclination angle of the supporting areas 34, 36. When the speed decreases again, the roller elements 32 again move radially inward and arrive in the area of portion 1. In the graph in FIG. 3, this is noticeable by a movement back along curve segment C, but now beyond the value of 1000 revolutions per minute to lower speed values, because when the roller elements are positioned in portion I the force which is generated by the sole inclined position of the supporting areas 36 and which pretensions the roller elements 32 toward the radial inner side is initially so small that the present centrifugal forces are sufficient up to appreciably lower speeds to hold the roller elements 32 in the area of the portion I and accordingly in the area of a substantially constant pressing force or actuation force F as can be seen from segment d in FIG. 3. It is not until the speed drops below a determined limiting speed that the forces which are generated in portion I at the relatively small relative inclination angle and which pretension radially inward are also sufficient to move the roller elements 32 radially inward again, so that they are displaced radially inward substantially spontaneously as illustrated by segment e in FIG. 3.

It should be noted that the different relative inclination angles in portions $I_i$, I, $I_a$ can be adapted to the respective operating requirements. In particular, a gradual and smooth braking of the roller elements 32 can be generated in portion $I_a$ by a continuous transition to a larger relative inclination angle.

Of course, the above-described variation of the relative inclination angle between the supporting areas 34, 36 can also be realized in a different way. For example, the supporting areas 34, 36 located opposite one another can be inclined in the same direction with respect to the axis of rotation A, but with different angles of inclination.

Further, the principles of the invention can, of course, also be realized when the roller elements 32 do not act on the pressing plate via the plate-like supporting element 30 and the actuation force transmission element, but rather when the second supporting areas 36 are formed directly at the pressing plate 18 itself. The braking effect according to the invention can also be achieved in that the increasing relative inclination angle is obtained not through corresponding curvature of the first supporting areas but rather, alternatively or in addition, the second supporting areas 36 also have a corresponding curvature.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An actuation force generating arrangement for a centrifugal clutch, said arrangement comprising:

a housing which is rotatable about an axis, said housing having a plurality of first supporting areas which each extend radially with respect to said axis, and an axially extending outer wall arranged radially outward adjacent to said first supporting areas;

a supporting element which is axially movable with respect to said housing, said supporting element having a plurality of second supporting areas which each extend radially with respect to said axis, each said second support area being separated from a respective said first support area by an axial distance which decreases with radial distance from the axis, each of said first and second support areas having a first radially inner portion and a second portion which lies radially outside of said first portion in a radial outer area adjacent to said outer wall of said housing, said first and second support areas being inclined with respect to each other with a relative inclination angle between them which is greater at said second portions than at said first portions; and a plurality of roller elements supported between respective pairs of said first and second support areas, each of said first and second support areas providing a rolling track for said roller elements, each of said roller elements being radially displaceable by centrifugal force along the respective pair of said first portions and the respective pair of said second portions of said support areas, wherein said greater relative inclination angle at said second portions increases a holding force acting on said roller elements, whereby said roller elements are prevented from abruptly striking against said outer wall.

2. The actuation force generating arrangement of claim 1, wherein said relative inclination angle at said second portions increases substantially continuously radially outward.

3. The actuation force generating arrangement of claim 1, wherein each of said first and second support areas has a transitional portion which lies between said first portion and said second portion, said relative inclination angle at said transitional portions being smaller than said relative inclination angle at said first portions.

4. A centrifugal clutch comprising an actuation force generating arrangement, said actuation force generating arrangement comprising:
   a housing which is rotatable about an axis, said housing having a plurality of first supporting areas which each extend radially with respect to said axis, and an axially extending outer wall arranged radially outward adjacent to said first supporting areas;
   a supporting element which is axially movable with respect to said housing, said supporting element having a plurality of second supporting areas which each extend radially with respect to said axis, each said second support area being separated from a respective said first support area by an axial distance which decreases with radial distance from the axis, each of said first and second support areas having a first radially inner portion and a second portion which lies radially outside of said first portion in a radial outer area adjacent to said outer wall of said housing, said first and second support areas being inclined with respect to each other with a relative inclination angle between them which is greater at said second portions than at said first portions; and
   a plurality of roller elements supported between respective pairs of said first and second support areas, each of said first and second support areas providing a rolling track for said roller elements, each of said roller elements being radially displaceable by centrifugal force along the respective pair of said first portions and the respective pair of said second portions of said support areas, wherein said greater relative inclination angle at said second portions increases a holding force acting on said roller elements, whereby said roller elements are prevented from abruptly striking against said outer wall.

* * * * *